United States Patent Office.

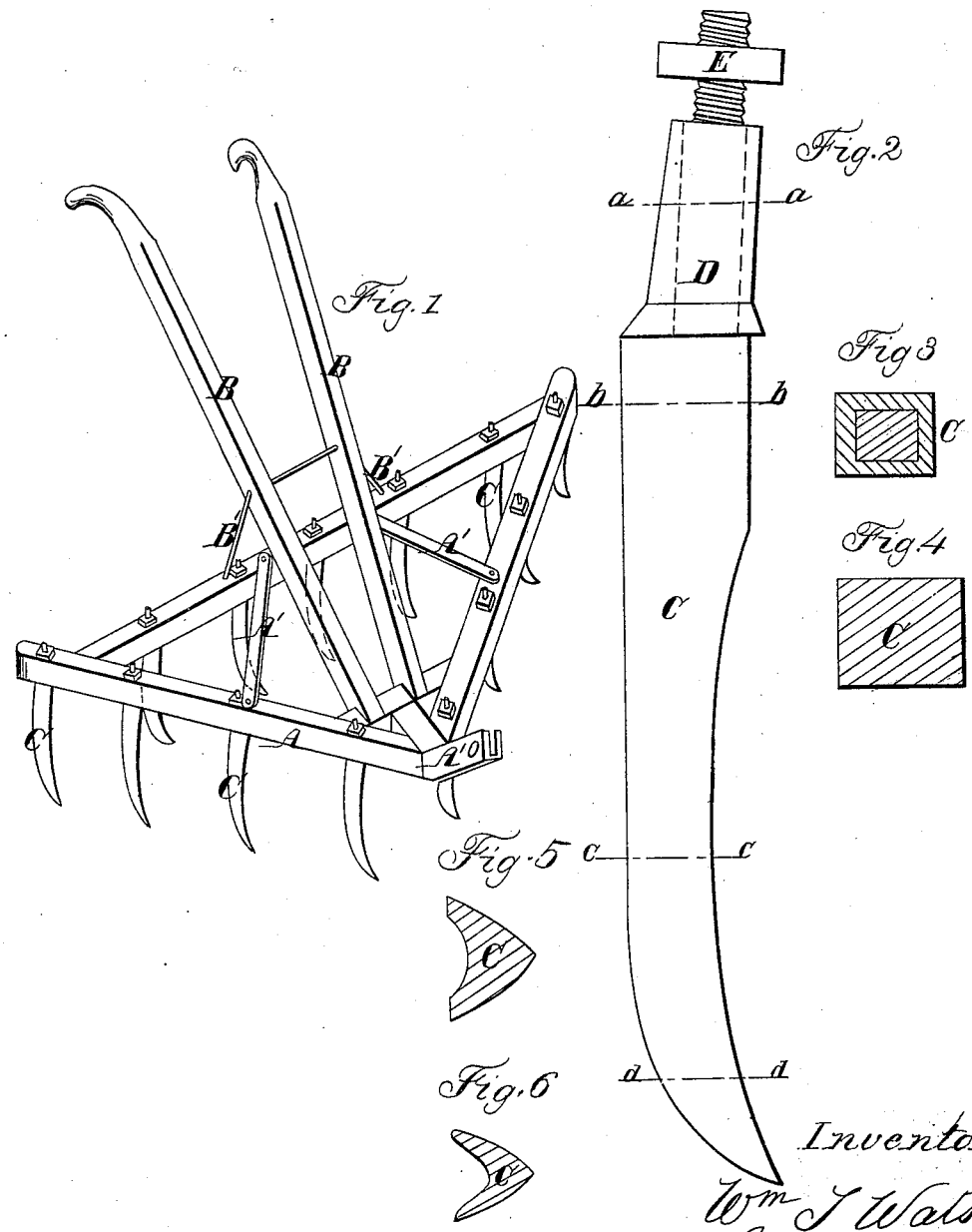

IMPROVEMENT IN CULTIVATORS.

WILLIAM T. WATSON, OF NOTTINGHAM, MARYLAND.

Letters Patent No. 60,449, dated December 11, 1866.

*The Schedule referred to in these Letters Patent and making part of the same.*

TO ALL WHOM IT MAY CONCERN:

Be it known that I, WILLIAM T. WATSON, of Nottingham, in the county of Prince George's, and State of Maryland, have invented a new and useful Improvement in Cultivators; and I do hereby declare that the following is a full, clear, and exact description of the same, reference being had to the annexed drawing, making part of this specification, in which—

Figure 1 is a perspective view.
Figure 2 is a side elevation of one of the teeth and socket.
Figure 3 is a horizontal section of a tooth on the line $a\ a$, fig. 2.
Figure 4 is a similar section on line $b\ b$.
Figure 5 is a similar section on line $c\ c$.
Figure 6 is a similar section on line $d\ d$.

The same letters are employed in the designation of identical parts.

A is a triangular frame of wood, with holes formed for the reception of the sockets and teeth, to which is attached the handles B, the tongue being attached to the point of the frame at A'. C are the teeth which I form with a curve towards the point, as shown in fig. 2, the front of the tooth being formed with an acute angle, as shown in the sectional figures 5 and 6, so as to divide the soil and pass through it with less resistance than is incident to the square or flat tooth. The teeth, thus constructed, are inserted in a metallic socket, D, the tube of which tapers upwards corresponding with the taper in the shank of the tooth, so that the tooth shall be held rigidly within the socket, being retained when inserted by the nut E.

That which I believe to be new in the construction of this cultivator, and desire to secure by Letters Patent, is—

1. The teeth C of a cultivator when constructed as set forth.
2. The combination of the frame A, teeth C, and metallic sockets D, when said several parts are respectively constructed, and the whole arranged substantially as set forth.

In testimony whereof I have signed my name to this specification in the presence of two subscribing witnesses.

WILLIAM T. WATSON.

Witnesses:
WM. H. BURCH,
JOHN R. RICHARDSON.